United States Patent [19]

Watarai et al.

[11] Patent Number: 5,095,319
[45] Date of Patent: Mar. 10, 1992

[54] OPTICAL SCANNING WITH LIGHT QUANTITY COMPENSATION

[75] Inventors: Shinichi Watarai, Yokohama; Shunji Kitagawa, Takasago; Yoji Houki, Tokyo, all of Japan

[73] Assignee: Fujitsu Limited, Kawasaki, Japan

[21] Appl. No.: 397,885

[22] Filed: Aug. 23, 1989

[30] Foreign Application Priority Data

Aug. 26, 1988 [JP] Japan ................................. 63-212058

[51] Int. Cl.$^5$ ............................................. H04N 1/21
[52] U.S. Cl. ..................................... 346/108; 346/160
[58] Field of Search ................. 346/108, 107 R, 76 L, 346/160

[56] References Cited

U.S. PATENT DOCUMENTS

4,612,555 9/1986 Hongou et al. .................... 346/108
4,742,363 5/1988 Shiraishi ............................ 346/108

Primary Examiner—Mark J. Reinhart
Attorney, Agent, or Firm—Staas & Halsey

[57] ABSTRACT

An optical beam apparatus includes a light emission device, a driver for driving the light emission device with the applied VIDEO signal, an integral circuit for estimating a drop of the quantity of light emited by the light emission device from the VIDEO signal applied, and a light output control circuit for controlling the driver in compliance with the estimated result so that the quantity of light emitted by the light emission device becomes constant.

13 Claims, 6 Drawing Sheets

OPTICAL SCANNING WITH LIGHT QUANTITY COMPENSATION

BACKGROUND OF THE INVENTION

(1) Field of the Invention

The present invention relates to an optical beam scanning apparatus which scans an intensity-modulated optical beam over a target surface with an optical scanning device. The intensity-modulated optical beam is produced by driving a light emission device such as a semiconductor laser.

(2) Description of the Related Art

In an electrophotographic apparatus, an optical beam scanning device has been used for scanning a beam that is by image information.

In such an optical beam scanning apparatus, it is required to keep the amount of light emitted from the light emission device, such as a light emission diode (LED), to a predetermined level.

Namely, in such a light emission device, the intensity of the optical scanning beam changes depending on the conditions of the optical scanning device and the ambient temperature.

Therefore, the gray level (concentration) becomes uneven in an image formed in such an electrophotographic apparatus described above.

For this purpose, a current for driving a light emission device has been set to make constant a light intensity of the optical beam based on a receiving output of a monitor diode, which monitors the light intensity of the optical beam from the light emission device. However, in cases where a semiconductor laser and light emission diode are used as the light emission device, such device changes in light emitting efficiency depending on temperature at the junctions. Namely, the light emitting efficiency is lowered as the temperature at the junction becomes higher.

The temperature at the junctions changes due to a duty ratio of a video signal or a drive current.

Accordingly, a large duty ratio of a video signal in the prior art has generated a problem because an exposure energy in the ending side of the scanning line is lowered by about 10 to 20% in comparison with that in the starting side of the scanning line.

SUMMARY OF THE INVENTION

Therefore, it is an object of the present invention to provide an optical beam scanning apparatus having a means to compensate for a drop of light emitting efficiency due to heat generation at the junctions of a light emission device.

It is another object of the present invention to provide an optical scanning apparatus which gives almost equal exposure energy to the scanning starting side and ending side of the optical beam.

These objects can be achieved by providing an optical beam scanning apparatus comprising a light emission device, a driver for driving such light emission device with a given video signal, means for estimating a drop of light quantity of the light emission device from the given video signal, and means for controlling the driver in accordance with the estimated result so that the light quantity of the optical beam output from the light emission device becomes constant.

These and other objects, features and advantages of the invention will be become more apparent upon a reading of the following detailed specification and drawing, in which:

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
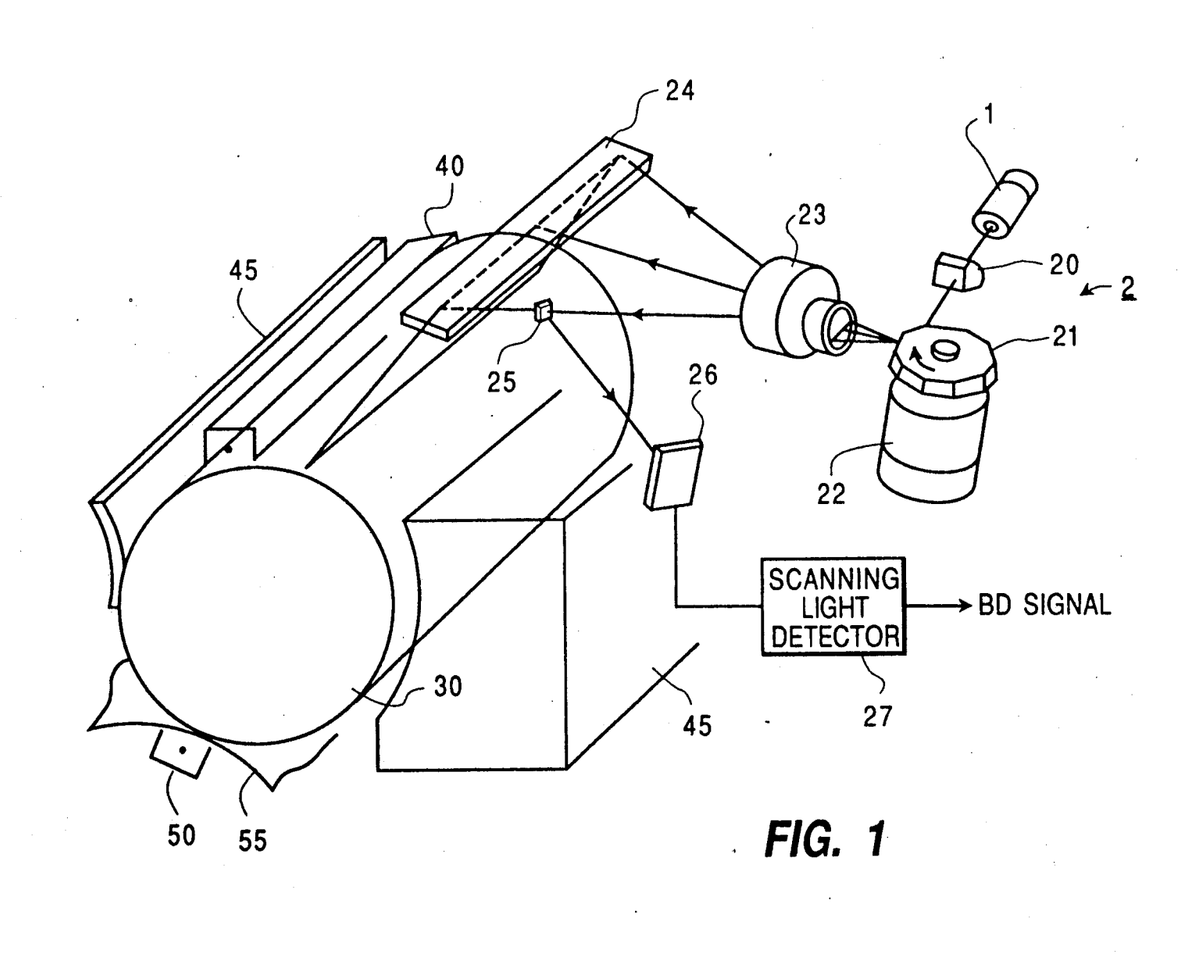
FIG. 1 is a schematic diagram of a constitution of an electrophotographic apparatus to which an optical beam scanning apparatus of the present invention is applied.

FIG. 1 is a schematic diagram indicating a constitution of an electrophotographic apparatus to which an optical beam scanning apparatus of the present invention is applied.

In FIG. 1, an output beam from the light source 1 is scanned by a light scanning means 2 having the constitution described later and irradiates a photosensitive drum 30 which is the scanning object. The photosensitive drum 30 is charged by a corona charger 40 and this photosensitive drum 30 is scanned for the exposure by the intensity-modulated optical beam. After a latent image is developed by a developing device 45 using a toner, the toner is transferred to a paper 55 by a transfer charger 50. The toner remaining on the photosensitive drum 30 is removed by a cleaning blade 60.

The light scanning means 2 comprises a cylinder lens 20, a polygon mirror 21, a spindle motor 22, an F-θ lens 23, a cylinder mirror 24 and a start detection mirror 25.

An output beam of light source 1 is converged by the cylinder lens 20 and enters the polygon mirror 21 which is rotated by the spindle motor 22. The beam is then reflected by the polygon mirror 21 and then enters the F-θ lens 23. The scanning beam from the F-θ lens 23 takes a long light path, is then reflected by the cylinder mirror 24 for expanding the scanning width and then enters the photosensitive drum 30 as the scanning surface.

Meanwhile, the start detection mirror 25 which reflects the left side end of the beam scanning width is provided between the F-θ lens 23 and the cylinder mirror 24 and the light reflected by the start detection mirror 25 is received by a photodetector (photodiode) 26 for start detection and a scanning light detection circuit 27 generates the start detection signal BD which indicated the start of scanning.

However, the light source of a kind described above changes the light quantity of the optical beam depending on the ambient temperature and the conditions of light scanning means 2.

Figure 2:
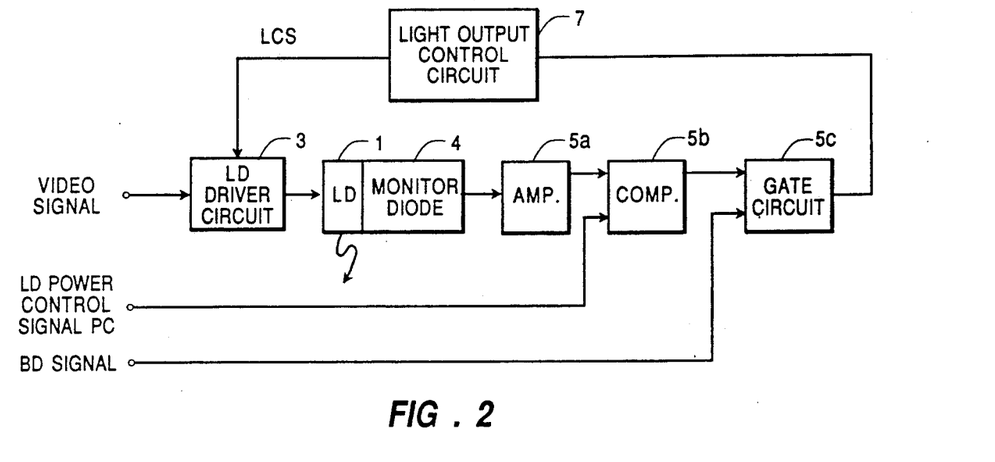
FIG. 2 is a block diagram indicating a constitution for keeping constant a light quantity of a light emission device when the scanning is started by an optical beam.
Figure 3:
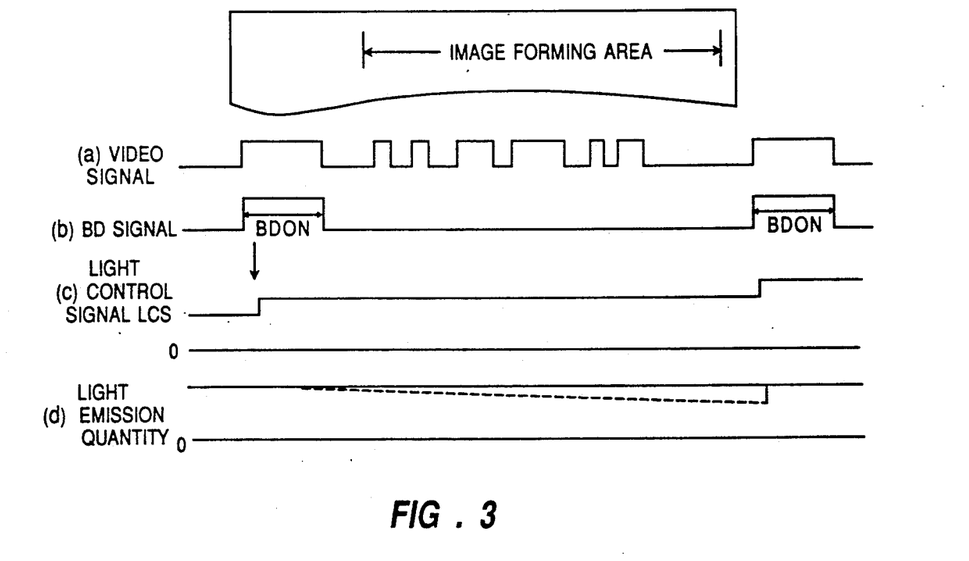
FIGS. 3A to 3D have waveforms for explaining operations of FIG. 2.

FIG. 2 is a block diagram indicating a constitution for keeping constant the light quantity of the light emission device at the time of starting the scanning of the optical beam and FIG. 3 shows waveforms for explaining operations of FIG. 2.

Explained hereunder is the case where a semiconductor laser is used as the light emission device provided as the light source 1. As shown in FIG. 2 and FIG. 3, the semiconductor laser 1 as the laser light source is driven by the (LD) driver depending on the video signal VIDEO.

The semiconductor laser 1 is provided with a monitor diode (photodetector) 4 which receives emitted light beam for monitoring.

The output of monitor diode 4 is sampled in a section other than the image forming region for ever scanning and a drive current of the driver 3 is set based on such sample value.

Namely, the output of the monitor diode 4 is amplified by an amplifier 5a. Thereafter, an output of amplifier 5a is compared, in the comparator 5b, with the LD power control signal PC which is adjusted and set previously to obtain the predetermined image concentration. The comparator 5b outputs "1" when the output of amplifier 5a is larger than the LD power control signal PC or outputs "0" when the output of amplifier 5a is smaller than the LD power control signal PC. The comparison output of the comparator 5b is sampled in the gate circuit 5c only for the period of BDON (FIG. 3(b)) with the start signal (BD signal). The output of comparator 5b is applied to the light output control circuit 7 through the gate circuit 5c. Thereby, the light output control circuit 7 changes a driving current value (light control signal LCS of FIG. 3(c)) which lowers the light emission quantity of output beam of the semiconductor laser 1 in the case where the output of gate circuit 5c is "1". Meanwhile, the light output control circuit 7 changes a driving current value to raise the light emission quantity in the case where the output is "0". The light output control circuit 7 holes this driving current for the one scanning period to input it to the driver 3.

With such constitution described, a light output level of the semiconductor laser 1 can be kept constant as shown by a solid line of FIG. 3(d) even when the ambient temperature changes.

However, when the semiconductor laser 1 is driven, for example, with the VIDEO signal shown in FIG. 3(a), the light quantity is gradually lowered as shown by a broken line of FIG. 3(d), due to the influence of heat generation at the junctions of semiconductor laser 1.

Figure 4:
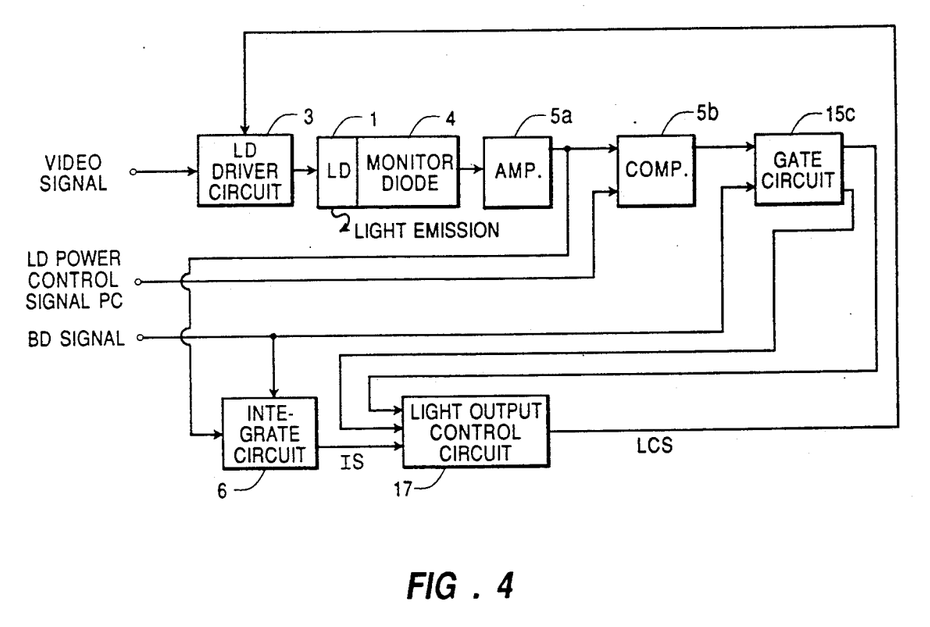
FIG. 4 is a block diagram indicating a constitution of the embodiment for keeping constant a light quantity of an optical beam during the period from starting to ending of the scanning by the optical beam.
Figure 5:
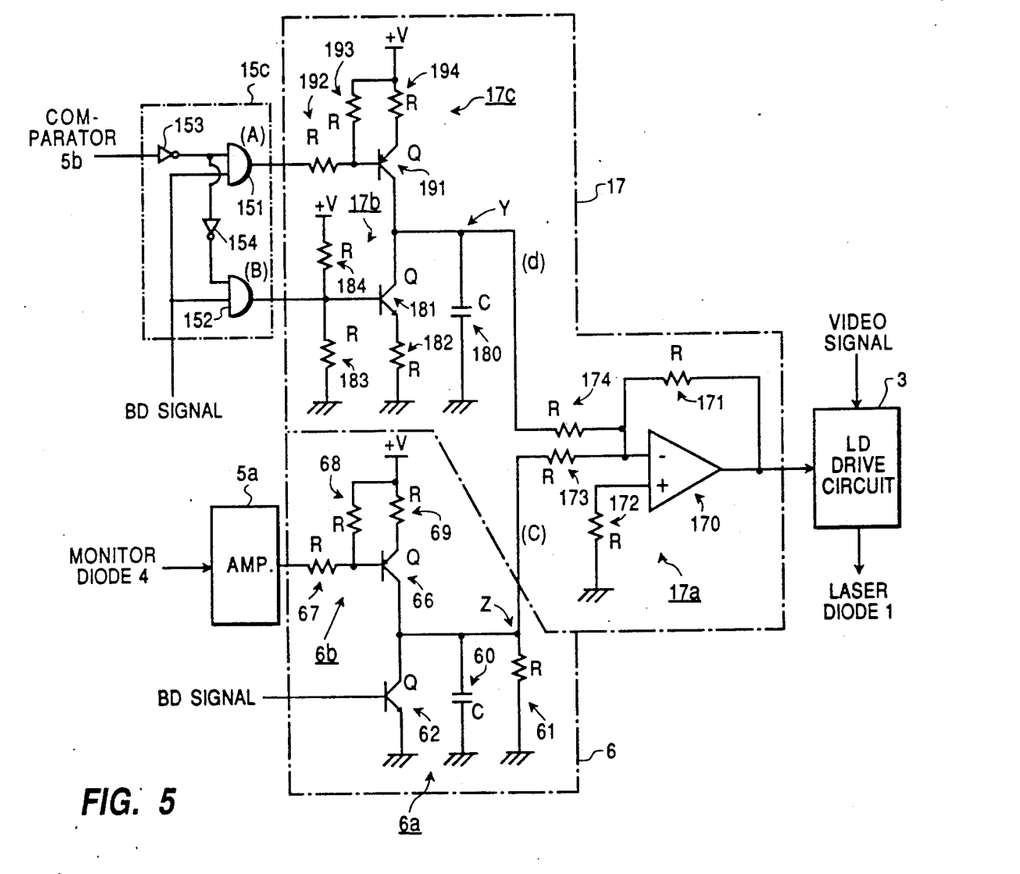
FIG. 5 is a detailed circuit diagram of a gate circuit, integral circuit and light output control circuit shown in FIG. 4.
Figure 6:
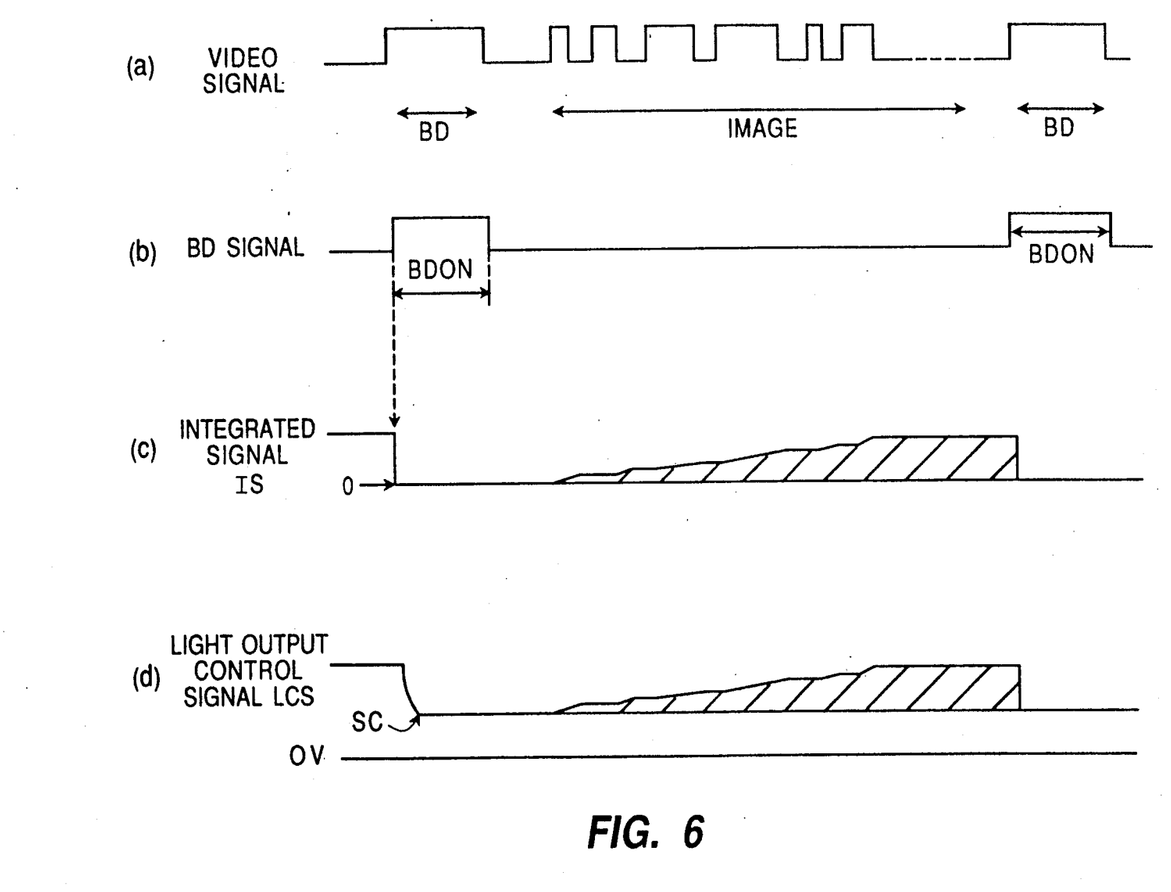
FIGS. 6A to 6D have waveforms for explaining operations of FIG. 4 and FIG. 5.

FIG. 4 is a block diagram indicating the constitution of an embodiment for keeping constant the light quantity of the optical beam during the period from the starting to the ending of the scanning of optical beam, while FIG. 5 is a constitution of the detail circuit diagram of the gate circuit, integral circuit and light output control circuit shown in FIG. 4. FIG. 6 shows waveforms for explaining operations of FIG. 4 and FIG. 5.

In these figures, elements like those shown in FIG. 1 and FIG. 2 are designated by like reference numerals.

The semiconductor laser 1 is driven ON/OFF corresponding to the video signal VIDEO by the LD driver 3. A driving current output when the LD driver 3 is operated is controlled by the light output control signal LCS.

The light emission level of semiconductor laser 1 is detected by the monitor diode 4 comprised in the semiconductor laser 1 and is then converted to a current.

An output of monitor diode 4 is voltage-converted by the amplifier 5a and is compared with the level (reference level) of the LD power control signal PC in the comparator 5b.

The output level thereof controls the signal level of light output control circuit 17 only when the BD signal is high level (BDON). Namely, as described previously, when the light output signal of monitor diode 4 has a level lower than the reference level PC, the light output control circuit 7 provides the output to raise the light emission level. When the output is higher than the reference level PC, the light output control circuit 7 provides the output to lower the light emission level.

Such control is carried out only when the BD signal is at the high level (BDON) and the light output signal level of monitor diode 4 is set to the same level as the reference level PC.

The LD power control signal PC is used for setting the concentration of printing (setting of light intensity of semiconductor laser 1) and it can be manually set by the switch on the operator panel provided to the electrophotographic apparatus.

Simultaneously, the BD signal is discharged to 0 V at BDON in the integral circuit 6 and an output of monitor diode 4 in the amplifier 5a is integrated.

Therefore, an output voltage of integral circuit 6 increases with the light emission period of semiconductor laser 1.

Namely, as shown in FIG. 5, the integral circuit 6a includes a capacitor 60 for signal voltage integration and a resistor 61 for setting discharge current. The integral circuit 6a discharge to 0 V when the high level BD signal (BDON) is applied to the base of a discharge transistor 62 for capacitor 60 as shown in FIG. 6(b). Accordingly, this integral circuit 6a discharges to 0 V when the high level BD signal (BDON) is applied for every one scanning by the polygon mirror 21.

Thereafter, when the VIDEO signal as shown in FIG. 6(a) is applied to the LD driver, an output of the monitor diode 4 is applied, through the amplifier 5a, to the charging circuit 6b for charging the capacitor 60. The charging circuit 6b includes the resistors 67, 68, 69 for setting charging current and a transistor 66 for charging the capacitor 60.

Accordingly, as shown in FIG. 6(c), the capacitor 60 of integral circuit 6a is charged by the charging circuit 6b when the VIDEO signal is ON during the scanning period of image forming area of laser and is discharged through the resistor 61 when the VIDEO signal is OFF. Thereby, the capacitor 60 holds a value depending on duration period of driving time of semiconductor laser 1. A voltage appears at terminal 2 depending on charge held by the capacitor 60 as shown in FIG. 6(c).

Meanwhile, the light output control circuit 17 comprises an adder circuit 17a formed by an operation amplifier 170 for voltage addition and resistors 171, 172, 173, 174 for setting an addition constant.

The adder circuit 17a adds the voltage appearing at the terminal z and the voltage appearing at the terminal Y and gives an added output to the LD driver.

On the other hand, a holding voltage of the capacitor 180 holding the light output control voltage appears at the terminal Y.

The capacitor 180 is discharged by the discharging circuit 17b including the transistor 181 and resistors 182, 183, 184 for setting discharge current. Moreover, this capacitor 180 is charged by the charging circuit 17c including the transistor 191 and resistors 192, 193, 194 for setting a charging current.

To the base of transistor 191 of this charging circuit 17c, an output of the AND circuit 151 including in the gate circuit 15c is connected through the resistor 192. In addition, to the base of transistor 181 of the discharge circuit 17b, an output of the AND circuit 152 included in the gate circuit 15c is connected.

To the one input terminal of the AND circuit 151, the signal obtained by inverting an output of the comparator 5b with the inverting circuit 153 is input, while to the other input terminal, the BD signal is input.

Moreover, to the one input terminal of the AND circuit 152, the signal obtained by inverting an output of the inverting circuit 153 with the inverting circuit 154 is input, while to the other input terminal, the BD signal is input.

Therefore, the AND circuit 151 outputs "1" only when the output of comparator 5b is "0" while the BD signal is BDON and the charging circuit 17c charges the capacitor 180 only during this period.

Meanwhile, the AND circuit 152 outputs "1" only when an output of the comparator 5b is "1" while the BD signal is BDON and the discharging circuit 180 discharges the capacitor 180 only during this period.

As can be understood from above explanation, the light output control circuit 17 lowers a holding voltage of capacitor 180 with the effect of the discharging circuit 17b while an output of the monitor diode 4 amplified by the amplifier 5a is higher than the LD power control signal PC during the period where the BD signal is high lever (BDON). When an output of the monitor diode 4 amplified by the amplifier 5a is lower than the LD power control signal PC, the light output control circuit 17 raises a holding voltage of capacitor 180 with the effect of the charging circuit 17c.

Thereby, as explained with reference to FIG. 2 and FIG. 3, the light quantity can be kept to a constant following variation of ambient temperature.

Here, a holding voltage of capacitor 180 and a holding voltage of capacitor 60 in the integral circuit 6 are respectively input to the operational amplifier 170 through the resistors 174, 173 for setting the addition constant and added therein. With an output voltage of this adder circuit 17a, the driving current of LD driver 3 is set.

Accordingly, as shown in FIG. 6, the light output control signal LCS (FIG. 6(d)) has the format that the integral signal IS (FIG. 6(c)) is added to the comparison output SC set for every scanning.

Namely, in the first non image area where the VIDEO signal is in the OFF level, the signal LCS is controlled to the level of LD power control signal PC. Thereafter, the VIDEO signal goes to the ON level and increases with light emission of the semiconductor laser 1.

Therefore, deterioration of light emission efficiency due to heat generation at the junction of semiconductor laser 1 can be compensated by increasing a driving current of the LD driver 3.

Namely, in the starting side of scanning, the reference light quantity preset in the period of BDON is assured and the light quantity compensated by the effect of integral circuit is assured in the ending side of scanning.

Therefore, almost the same light quantity can be maintained in both the starting and ending sides of the scanning. Accordingly, uneven gray level (concentration) is no longer generated in both sides of the output in the electrophotographic apparatus comprising such a optical beam scanning device.

In the embodiment described above, the semiconductor laser is used as the light source and the detection output of the monitor diode 4 is integrated.

Figure 7:
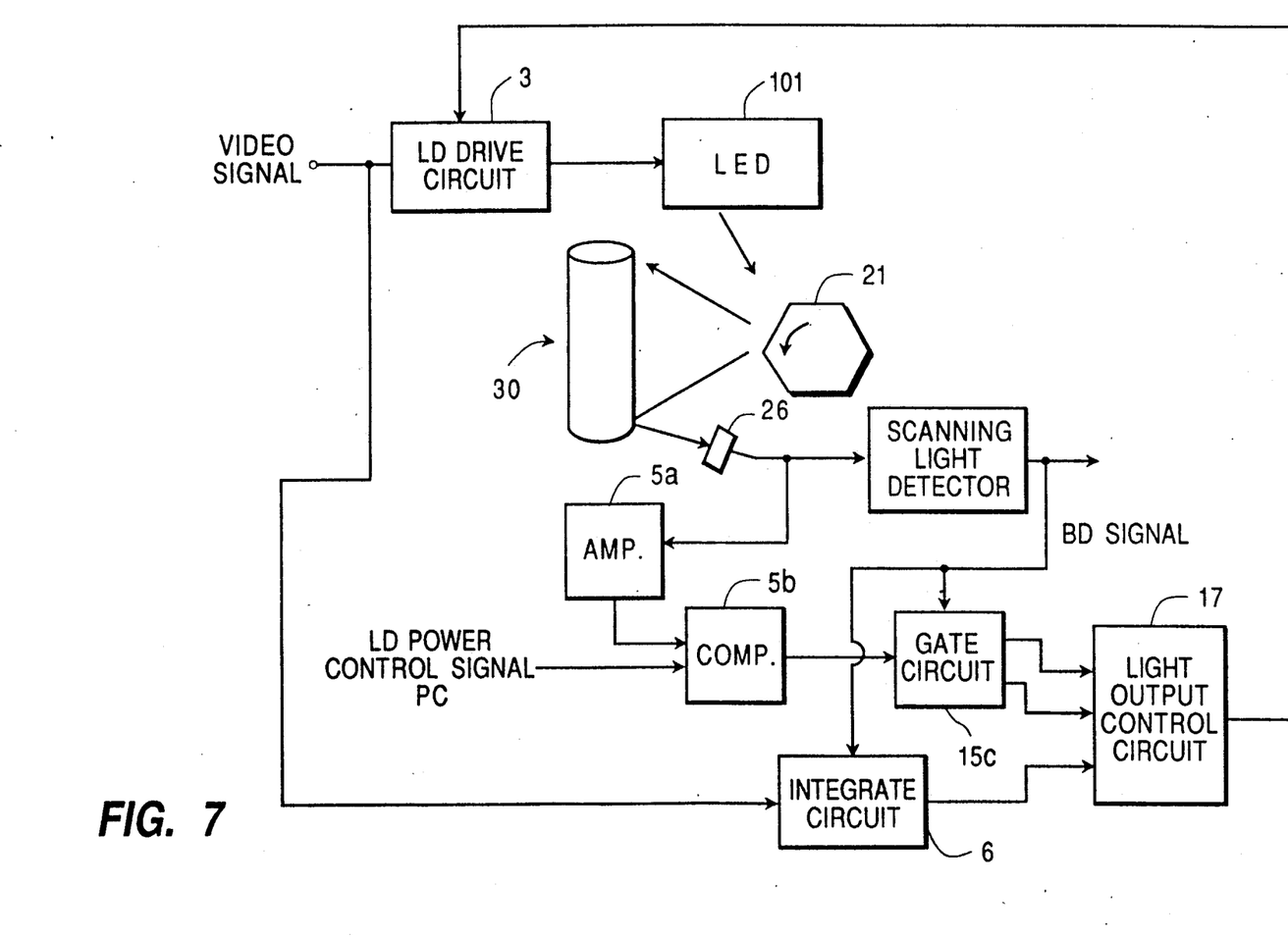
FIG. 7 is a block diagram indicating a constitution of another embodiment.

However, in case the light emission diode (LED) 101 is used as the light source, a monitor diode is not used. Therefore, as shown in FIG. 7, the light quantity of LED 101 is supplied to the amplifier 5a by detecting the optical beam reflected from the surface of photosensitive drum 30 by the photodetector 26 for start detection. Meanwhile, the VIDEO signal applied to the LD driver 3 is input to the integral circuit 6.

The other constitution is similar to those shown in FIG. 4 and FIG. 5.

With the constitutions shown in FIGS. 4 and 5, the light quantity can also be kept constant in the same way as the case where the LED 101 is used.

In the embodiment shown in FIG. 4, it is permitted that the VIDEO signal applied to the LD driver is integrated, without integrating an output of the monitor diode 4.

As explained heretofore, the amount of heat generated at the junction of light emission device is established by an integral value obtained by integrating the VIDEO signal and a driving current of semiconductor laser is controlled by correcting the sampled comparison control signal. Therefore, deterioration of light emission efficiency due to heat generation at the junction of semiconductor laser can be compensated and optical scanning can be realized with stablished light quantity.

Moreover, such effect can be achieved by controlling only the driving current and therefore such effect can be attained easily and economically.

While the present invention has been particularly described with reference to a preferred embodiments thereof, it is to be understood that the present invention is not limited thereto in any way but covers any and all changes and modifications which are possible within the scope of the claims.

What is claimed is:

1. An optical beam scanning apparatus comprising:
   light emission means for emitting an optical beam based on a driving signal;
   driving means for driving said light emission means by providing the driving signal based on a light output control signal;
   light scanning means for scanning the optical beam;
   photodetecting means for monitoring and receiving the optical beam and for providing a first output signal based on the optical beam;
   comparing means for providing a second output signal by sampling the first output signal and comparing the first output signal with a reference level;
   integral means for providing an integrated signal by integrating the first output signal; and
   light output control means for providing the light output control signal based on the second output signal and the integrated signal.

2. An optical beam scanning apparatus according to claim 1, wherein said light emission means includes a semiconductor laser.

3. An optical beam scanning apparatus according to claim 1, wherein said light emission means includes a light emission diode.

4. An optical beam scanning apparatus according to claim 1, wherein said light scanning means comprises a rotary polygon mirror and the f-θ lens.

5. An optical beam scanning apparatus according to claim 1, said integral means includes an integration circuit.

6. An optical beam scanning apparatus comprising:
light emission means for emitting an optical beam based on a driving signal;
driving means for driving said light emission means by providing the driving signal based on a light output control signal and a VIDEO signal;
estimation means for providing an estimation signal by estimating a change in the light quantity of the light beam, said change in the light quantity being due to a change in the light emitting efficiency of the light emission means caused by the driving signal; and
first control means for providing the light output control signal based on the estimation signal.

7. An optical beam scanning apparatus according to claim 6, wherein said light emission means includes a semiconductor laser.

8. An optical beam scanning apparatus according to claim 6, said light emission means includes a light emission diode.

9. An optical beam scanning apparatus according to claim 6, said estimation means includes an integration circuit for integrating the VIDEO signal.

10. An optical beam scanning apparatus according to claim 6, further comprising:
light scanning means for scanning the optical beam from a starting point to an end point; and
a second control means for setting a driving current of the driving signal so that the light quantity of the optical beam at the starting point of scanning is a predetermined value.

11. An optical beam scanning apparatus according to claim 10, wherein:
said estimation means comprises integral means for providing a first holding voltage by integrating the VIDEO signal;
said second control means comprises comparison means for providing a first output signal by comparing the light quantity of the optical beam with a reference value, a capacitor, and means for providing a second holding voltage in compliance with the first output signal; and
said first control means comprises adder circuit means for adding the first holding voltage and the second holding voltage.

12. An optical beam scanning apparatus according to claim 10, wherein:
said light emission means includes a semiconductor laser and a monitor diode.

13. An optical beam scanning apparatus according to claim 12, wherein:
said estimation means includes means for integrating an output of said monitor diode.

* * * * *